United States Patent
Dinan

(10) Patent No.: US 9,325,469 B2
(45) Date of Patent: Apr. 26, 2016

(54) CHANNEL STATE INFORMATION FEEDBACK

(71) Applicant: Esmael Hejazi Dinan, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 0 days.

(21) Appl. No.: 14/556,314

(22) Filed: Dec. 1, 2014

(65) Prior Publication Data
US 2015/0085806 A1  Mar. 26, 2015

Related U.S. Application Data

(63) Continuation of application No. 13/684,425, filed on Nov. 23, 2012, now abandoned.

(60) Provisional application No. 61/567,097, filed on Dec. 5, 2011.

(51) Int. Cl.
| | |
|---|---|
| *H04L 5/00* | (2006.01) |
| *H04W 24/00* | (2009.01) |
| *H04W 24/02* | (2009.01) |
| *H04L 27/26* | (2006.01) |
| *H04W 24/10* | (2009.01) |
| *H04W 84/04* | (2009.01) |

(52) U.S. Cl.
CPC .......... *H04L 5/0048* (2013.01); *H04L 27/2601* (2013.01); *H04W 24/00* (2013.01); *H04W 24/02* (2013.01); *H04W 24/10* (2013.01); *H04W 84/045* (2013.01)

(58) Field of Classification Search
CPC ...................................................... H04W 24/00
USPC ................................................... 370/329, 252
See application file for complete search history.

(56) References Cited

U.S. PATENT DOCUMENTS

| | | | |
|---|---|---|---|
| 2011/0212738 A1* | 9/2011 | Wan | H04L 5/0035 455/500 |
| 2013/0033998 A1* | 2/2013 | Seo | H04W 24/00 370/252 |

\* cited by examiner

*Primary Examiner* — Brandon Renner
*Assistant Examiner* — Voster Preval
(74) *Attorney, Agent, or Firm* — Esmael Dinan; David Grossman

(57) ABSTRACT

A wireless device receives a first reference signal from a first base station and estimates a first signal strength based on the received first reference signal. The wireless device receives a second reference signal from a second base station and estimates a second signal strength based on the received second reference signal. The wireless device estimates an interference value based, at least in part, on the second reference signal. The wireless device estimates a signal to interference ratio value based on the second signal strength and a total interference value. The total interference value is computed based upon the interference value or the interference value plus the first signal strength.

20 Claims, 15 Drawing Sheets

CHANNEL STATE INFORMATION FEEDBACK

CROSS-REFERENCE TO RELATED APPLICATIONS

This application is a continuation of application Ser. No. 13/684,425, filed Nov. 23, 2012, which claims the benefit of U.S. Provisional Application No. 61/567,097, filed Dec. 5, 2011, which is hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable channel state information feedback in wireless communication systems. Embodiments of the technology disclosed herein may be employed in the technical field of wireless communication systems. More particularly, the embodiments of the technology disclosed herein may relate to channel state information feedback in wireless communication systems.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
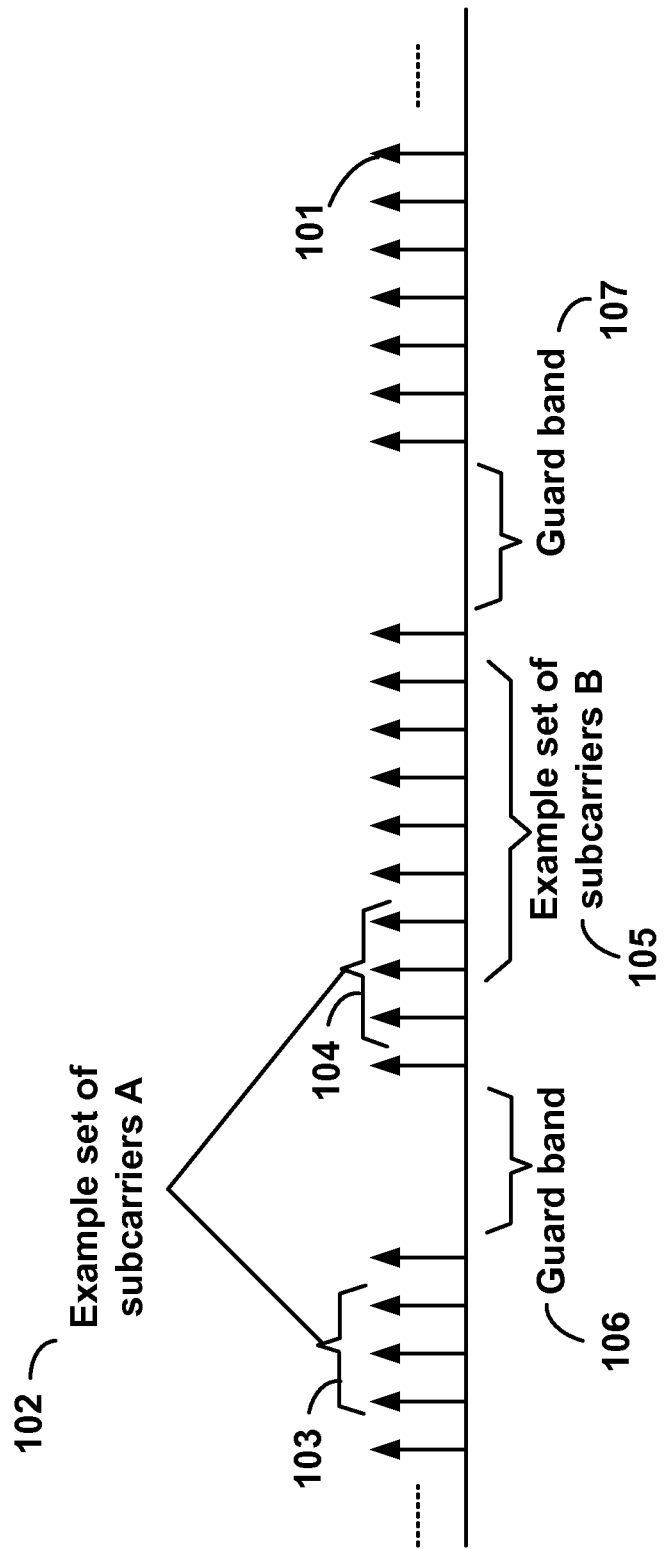
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
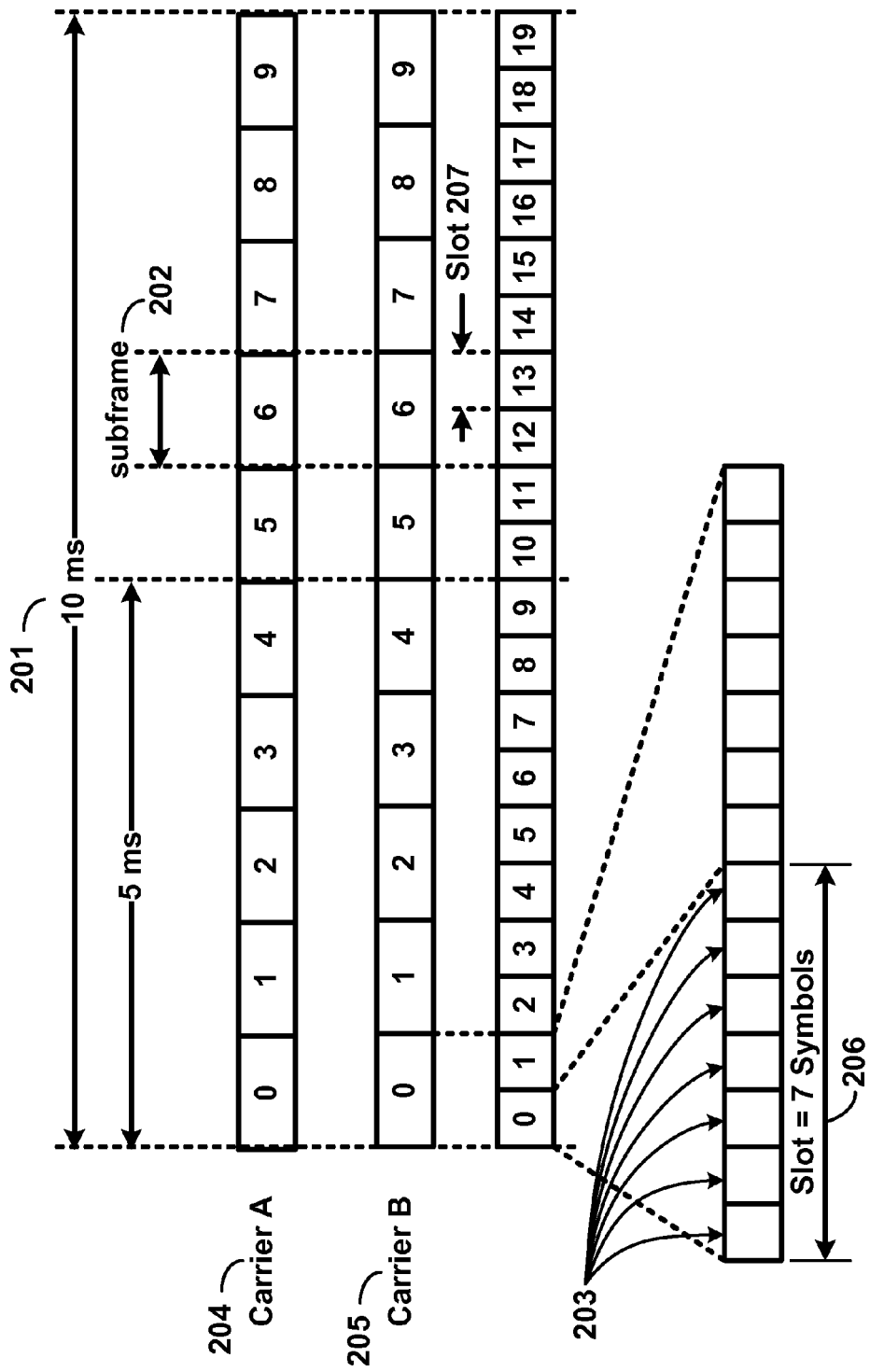
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Sub-frame(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
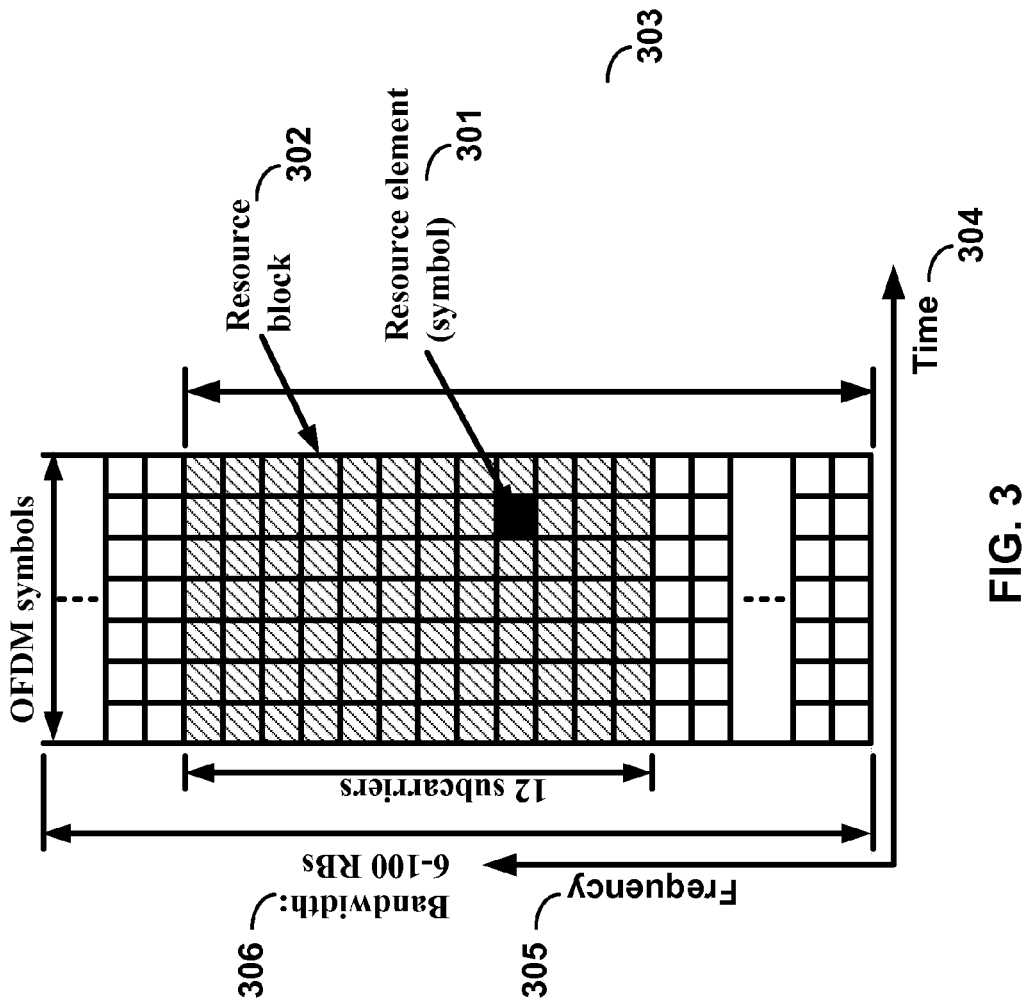
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
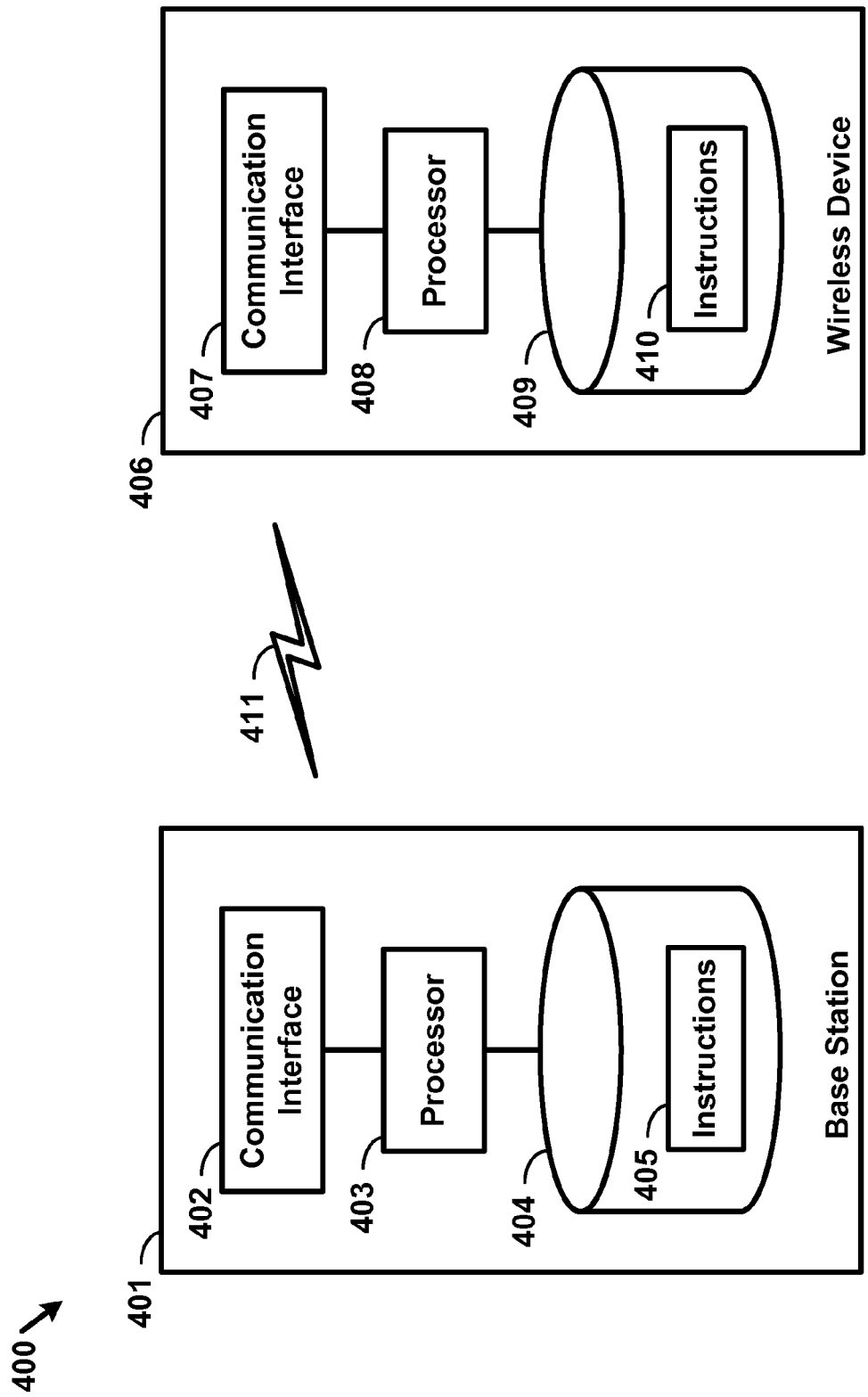
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
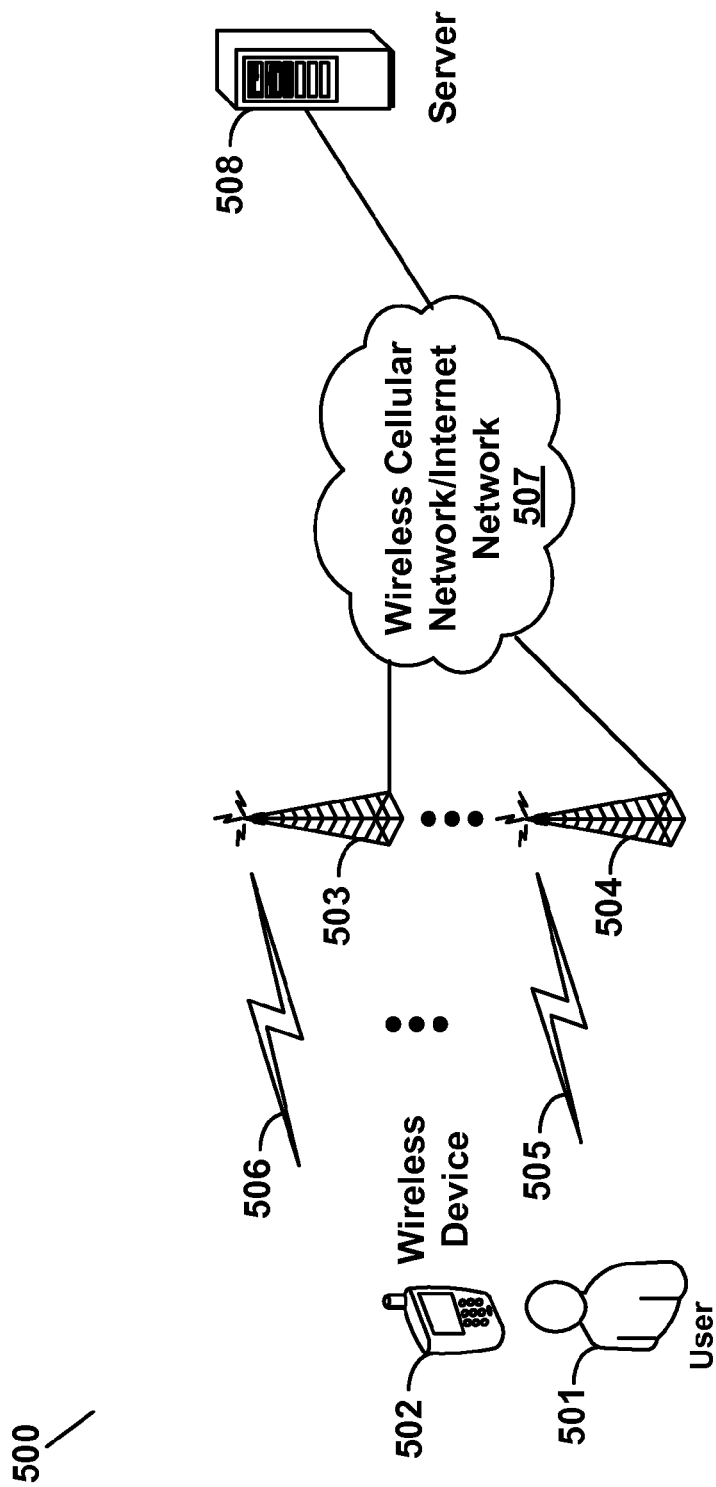
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Figure 6:
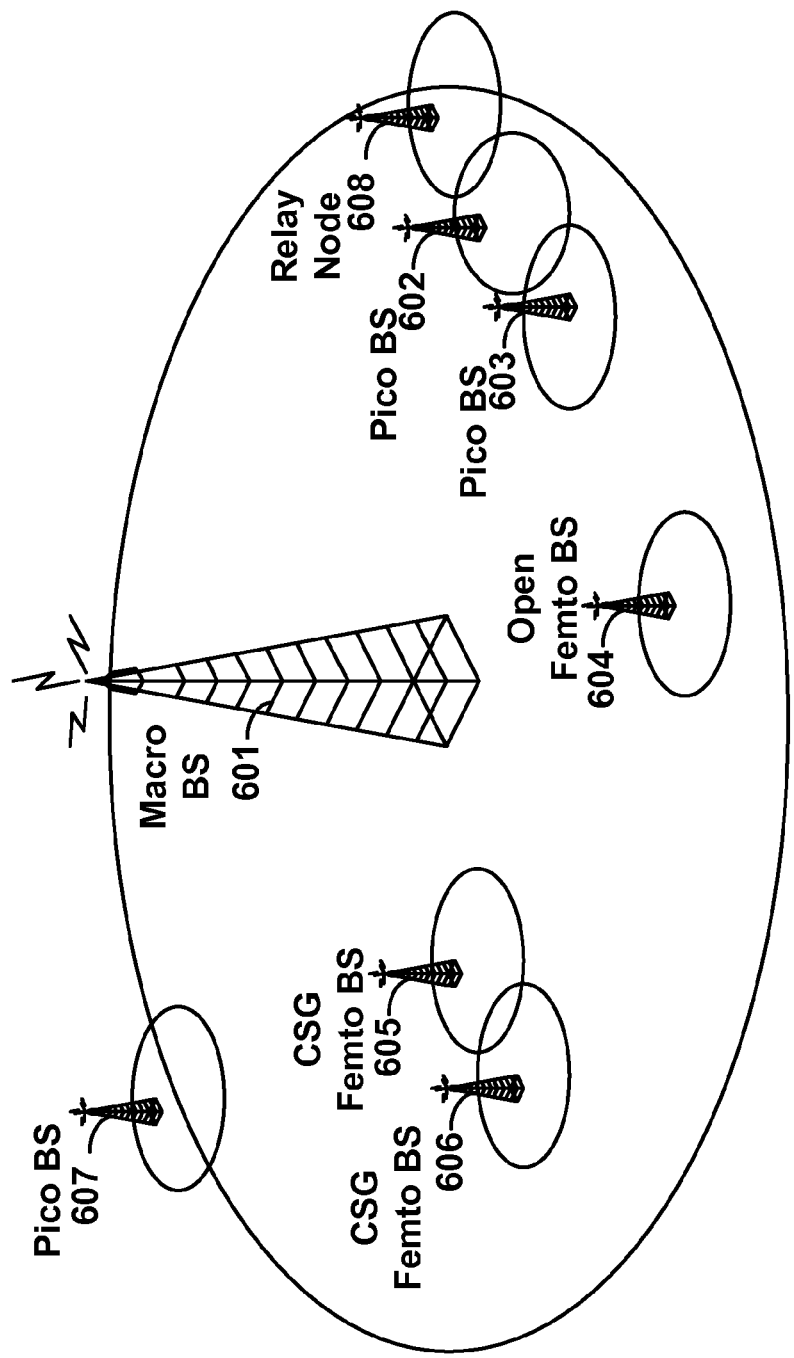
FIG. 6 is a diagram depicting an example heterogeneous network as per an aspect of an embodiment of the present invention.

FIG. 6 shows an example heterogeneous network in an example embodiment. The coverage and capacity of macro base station 601 may be extended by the utilization of base stations with lower transmit power. Micro, Pico, femto and relay nodes are examples of low power base stations. In an example embodiment, pico base stations (or pico-cell) 602, 603, and 607 may have transmit power ranges from approximately 200 mW to approximately 5 W. Macro base stations may have a transmit power that typically varies between 5 and 100 W. Femto base stations (or femto-cells) may be used for local services such as in indoor services, and their transmit power may be approximately 200 mW or less. These are just some example power ranges, and as such, should not be considered as a hard limit on the transmit power of a base station type. For example, some femto-cell product may transmit at a power greater than 200 mW. Femto or pico base stations 605, 606 may be configured with a restricted subscriber group that may allow access only to its closed subscriber group (CSG) members. Such femto or pico base stations may be referred to as closed femtos or picos. Femto or pico base stations may also be configured as open femtos 604 or picos 602, 603. Relay Nodes (e.g. 608) may employ the macro base stations air interface as a backhaul and may increase coverage and capacity of the macro base station. A network that comprises of a mix of macro base stations and low-power nodes such as pico or femto base stations, where some base stations may be configured with restricted access and some may lack a wired backhaul, is referred to as a heterogeneous network.

Femto cells may be classified as open or closed depending on whether the femto cells allow access to all, or to a restricted set of wireless devices. Closed femtos may restrict the access to a closed subscriber group (CSG). Open femtos may be similar to pico-cells, but may use the network backhaul provided by the home network. A femto cell may also be a hybrid, whereby many wireless devices may have access, but with lower priority for the wireless devices that do not belong to the femto's subscriber group. Closed femtos may not allow access to wireless devices, and may become a source of interference to those wireless devices. Co-channel deployments of closed femtos may cause coverage holes and hence outage of a size proportional to the transmit power of the femto-cell. Femto-cells may or may not have an X2 interface. OAM-based or X2 based techniques in conjunction with possibly autonomous power control techniques may be used for interference management with femto cells depending on the existence of a femto X2 interface. These techniques may reduce the outage and/or interference that these network nodes cause around them and enable reception of the signal from the macro-cell in close proximity to the closed femto.

Co-channel deployment of low-power nodes and high power nodes may introduce new challenges. The introduction of low-power nodes in a macro network may create an imbalance between uplink and downlink coverage. Due to the larger transmit power of the macro base station, the handover boundary may be shifted closer to the low-power node. This shift may lead to severe uplink interference problems as wireless devices served by macro base stations create strong interference to the low-power nodes. Given the relatively small footprint of low-power nodes, low-power nodes may become underutilized due to geographic changes in data traffic demand. The limited coverage of low-power nodes may be a reason for limited performance gain in heterogeneous networks. Some of the deployed femto cells may have enforced restricted associations, which may create a coverage hole and may exacerbate the interference problem.

Figure 7:
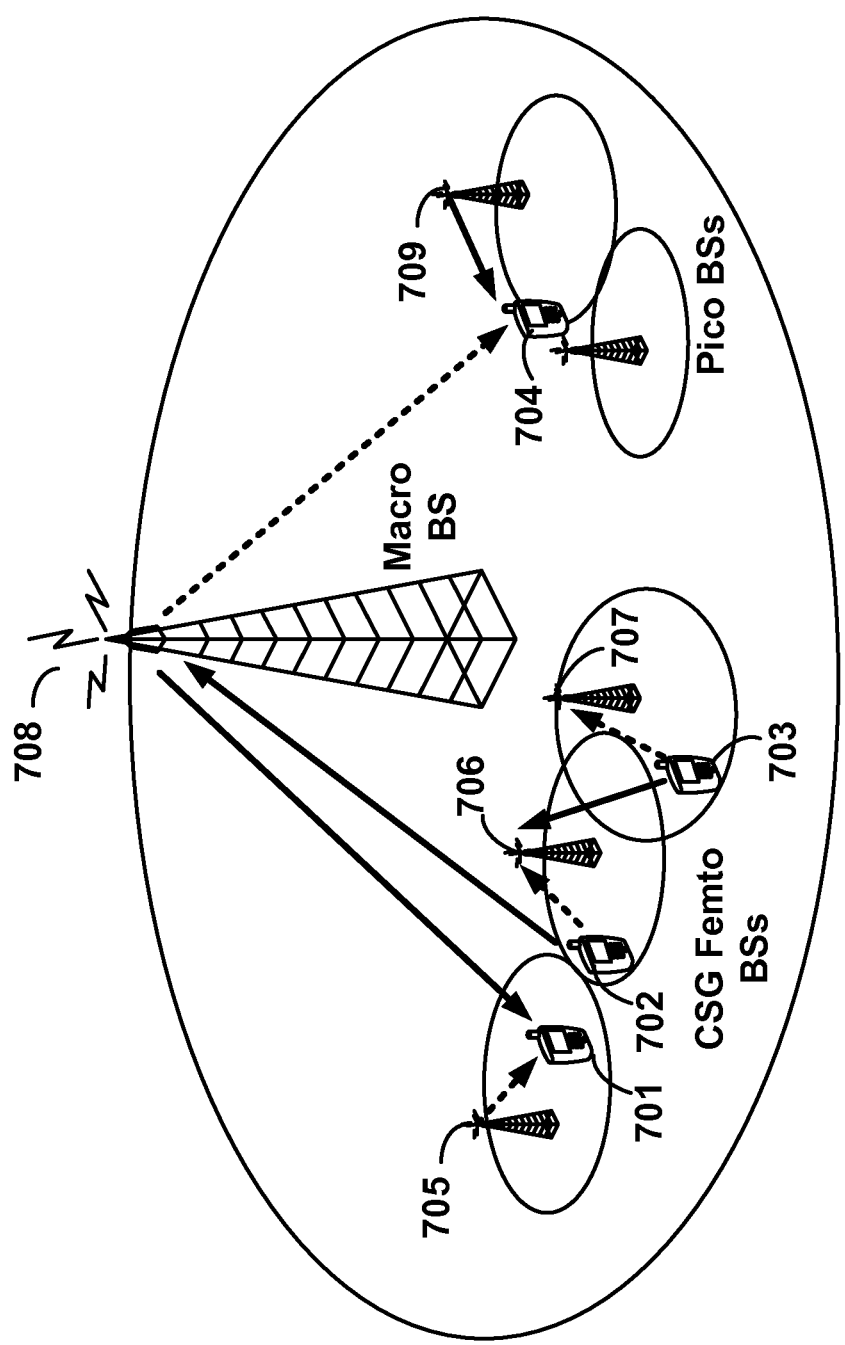
FIG. 7 is a diagram illustrating a few example interference scenarios as per an aspect of an embodiment of the present invention.

FIG. 7 illustrates a few example interference scenarios in an example embodiment. The solid arrow shows the desired signal, and the arrow with the dashed line shows the unwanted interference. Wireless device 701 may not be a member of CSG cell 705 and may be roaming in the coverage area of femto-cell 705. It may receive the signal from macro base station 708, and may receive high interference from CSG pico-cell 705. In another example, wireless device 702 may not be a member of CSG cell 706 and may be roaming in the coverage area of femto-cell 706. The wireless device 702 may transmit a signal to base station 708 in the macro base station uplink channel. The wireless device 702 may create high interference for femto-cell 706. The wireless device 703 may not be a member of CSG cell 707 and may be roaming in the coverage area of femto-cell 707. The wireless device 703 may be a member of CSG femto-cell 706 and may a transmit signal to femto-cell 706. The wireless device 703 may create high interference for femto-cell 707. In another example scenario, the wireless device 704 may be in the cell coverage edge of pico-cell 709. The wireless device 704 may receive a signal from pico-cell 709. The wireless device 704 may also receive high interference from macro base station 708. As shown in these examples, in order to cope with the interference, it may be required to introduce techniques that may adequately address these issues.

A new physical layer design in LTE networks may allow for flexible time and frequency resource partitioning. This added flexibility may enable macro- and femto/picocells to assign different time-frequency resource blocks within a carrier or different carriers (if available) to their respective wireless devices. This is one of the inter-cell interference coordination (ICIC) techniques and may be used on a downlink or an uplink to mitigate interference. With additional complexity, joint processing of serving and interfering base station signals may further improve the performance of heterogeneous networks.

According to some of the various aspects of embodiments, cell range expansion through handover biasing and resource partitioning among different node power classes may decrease interference. The biasing mechanism may allow for load balancing. Depending on the bias value, the network may control the number of wireless devices associated with the low-power nodes and therefore control traffic demand at those nodes. Resource partitioning, which may be adaptive, may allow configuration and adjustment of interference protected resources, enabling wireless devices in a cell's expanded area to receive data. Resource partitioning techniques may mitigate uplink and downlink interference and allow non-CSG member wireless devices to receive service when in proximity of closed femto-base stations.

In a heterogeneous network, the network nodes may be deployed in the same frequency layer. Deploying low-power nodes at the same frequency layer as the (high-power) macro-cells may present interference problems in the case of closed femtos. Also, for the case of open access nodes (open femtos, pico-cells, and RNs), the coverage of the low-power nodes may be overshadowed by the transmissions of the high-power nodes. Interference coordination techniques may solve these problems. A reduction of closed femto interference to the macro layer and a performance increase from the introduction of open access low-power nodes may be achieved by interference control techniques. To enable efficient support of co-channel deployment of heterogeneous networks, an interference management scheme may adapt to different traffic loads and different numbers of low-power nodes at various geographical areas.

According to some of the various aspects of embodiments, resource partitioning may be employed for interference management in co-channel deployments. To reach its full potential, resource partitioning may be paired with interference-cancellation-capable wireless devices. Similar approaches may be applied to micro, pico, femto, and relay nodes. Each node may have its own caveats. For example, the X2 backhaul link between the macro and relay base stations may be over an LTE air interface. In another example, closed femto cells may create their own interference challenges. Femto base stations may lack an X2 interface and employ static or dynamic interference management methods using OAM-based or similar solutions.

According to some of the various aspects of embodiments, adaptive interference management in LTE may be enabled through X2 backhaul coordination of resources used for scheduling data traffic. The granularity of the negotiated resource may be a subframe. One of the various motivations behind resource partitioning may be to control interference and/or enable cell range expansion through cell biasing. In a typical case, cell range expansion may be enabled to improve system capacity, and a cell bias may be applied to low-power nodes. The bias value may refer to a threshold that triggers a handover between two cells. A positive bias may enable a wireless device to be handed over to a pico-cell when the difference in the signal strength from the macro- and pico-cells drop below a bias value. The high-power node (macro base station) may inform the low-power node (pico base station) of which resources may be utilized for scheduling macro wireless device and which subframes would remain unutilized (almost blank subframes). Low-power nodes may be made aware of the interference pattern from a high-power base station and may schedule a wireless device in the cell extended areas on subframes protected from high-power interference. That is, subframes corresponding to almost blank subframes at the high-power base station.

Figure 8:
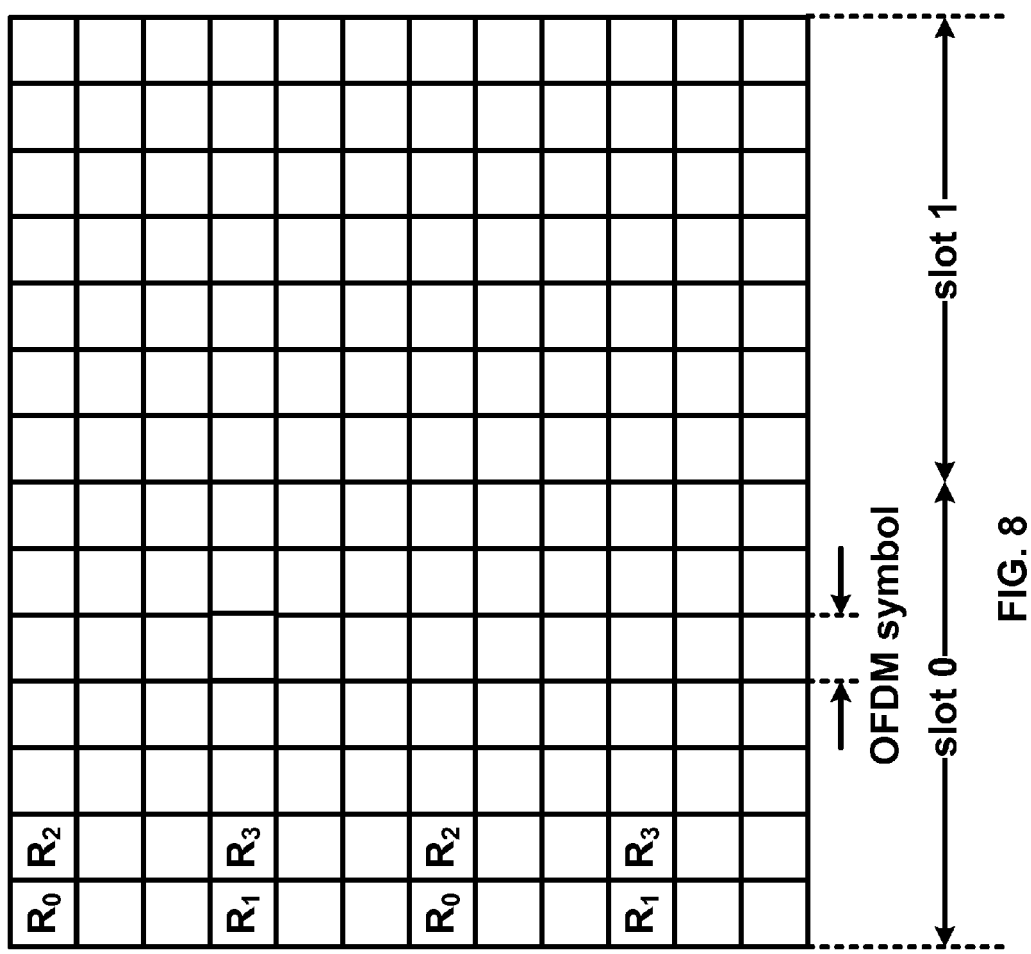
FIG. 8 is a diagram depicting an example almost blank subframe as per an aspect of an embodiment of the present invention.

According to some of the various aspects of embodiments, the X2 interface may enable direct base station to base station interface for inter-cell interference coordination (ICIC). Co-channel deployments of heterogeneous networks may require coordination of almost blank subframes. Almost blank subframes may reduce the interference created by the transmitting node while providing full legacy support. On almost blank subframes, base station may not schedule unicast traffic while it may transmit acquisition channels and common reference signal to provide legacy support. FIG. 8 shows an example almost blank subframe. In this example CRS (R0, R1, R2, R3 signals) are transmitted only in the control region and are not transmitted in the data region. The interfering base station may still transmit PSS, SSS, PBCH, and RSs to support legacy terminals. Some interference still may exist. In this example, no data may be transmitted in almost blank subframes or data may be transmitted at a substantially lower power in almost blank subframes.

Figure 9:
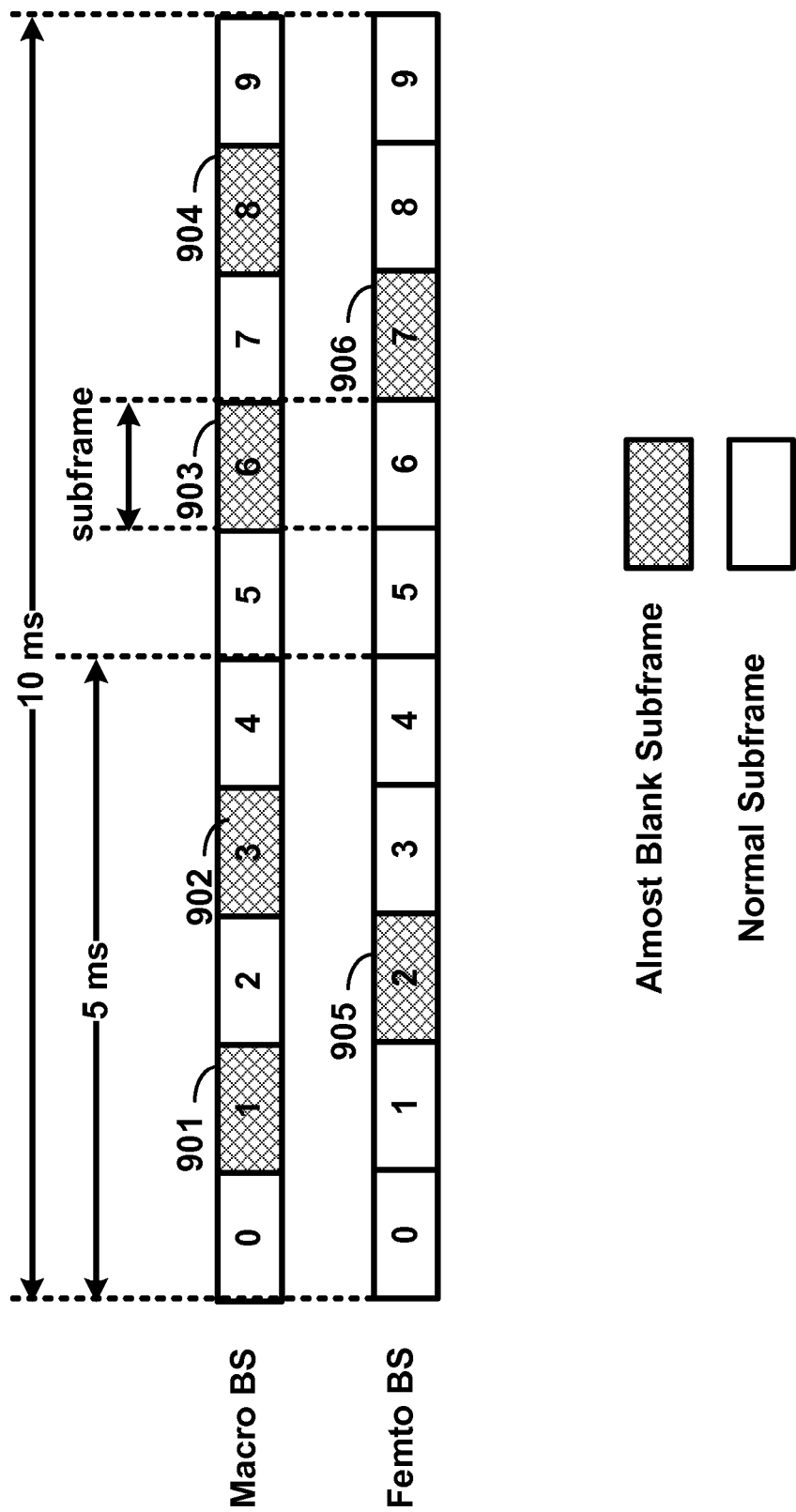
FIG. 9 is an example almost blank subframe configuration as per an aspect of an embodiment of the present invention.

Interference coordination using almost blank subframes may be performed by means of a bitmap. Each bit in the bitmap may be mapped to a single subframe. The size of the bitmap may be, for example, 40 bits, resulting in the interference pattern repeating itself after 40 ms. FIG. 9 shows an example almost blank subframe configuration in an example embodiment. In this example embodiment, no data may be scheduled in almost blank subframes (ABS). In another embodiment, data may be scheduled in almost blank subframes at a substantially lower power. Subframes 901, 902, 903, and 904 may be configured as ABS in the macro base station. When a macro base station transmits an almost blank subframe, data may not be scheduled in that subframe (or data may be transmitted at a substantially lower power). This may increase the coverage of the femto or pico base stations close to that macro base station. Subframes 905 and 906 may be configured as ABS in the femto base station. When the femto base station transmits an almost blank subframe, data may not be scheduled in that subframe (or data may be transmitted at a substantially lower power). This may increase coverage allowed for the macro base station or the neighboring femto base stations. In the example of FIG. 9, the almost blank subframe pattern may be repeated every 10 msec. This is just an example and various configurations may be possible. The almost blank subframe configuration may be changed dynamically according to load and traffic, time of the day, or many other parameters. In an example embodiment, based on the data traffic demand, the pattern may change as often as every 40 ms. The communication between nodes may be peer to peer. Or it may be in a master-slave relationship. The node creating dominant interference conditions may control which resources may be used to serve wireless devices in the cell range extension area. In an example scenario, a macro base station may be a master, and a pico base station may be a slave since cell range expansion would most frequently be established for pico base stations. The cell range expansion may be desirable for a macro base station as well. A use case for cell range expansion at the macro base station may be to reduce the number of handovers. In a scenario with a large number of high-mobility users, the number of handovers in the network may become a problem, for example when in the deployment of pico base stations the cells become small. The same resource partitioning schemes may then be utilized to allow high mobility macro wireless devices to remain attached to a macro-cell while deep inside coverage of a pico-cell. In this case, the pico base station may restrict scheduling data traffic on some resources, allowing coverage for high-mobility macro wireless devices.

According to some of the various aspects of embodiments, subframe resource partitioning may create an interference pattern that may require a new radio resource measurement paradigm. As dominant interference may potentially vary from one subframe to the other, in order to ensure radio resource management measurement accuracy, it may be needed to restrict measurements to a desired set of subframes. In an example embodiment, it may be desirable to define anchor interference-protected resources that may be utilized for radio resource measurement. The 40-bit bitmap may include indications of which subframes may have static protection from interference and therefore may be suitable for measurements. The remaining resources may change more often.

According to some of the various aspects of embodiments, the serving base station may inform a wireless device of the set of subframes to which the wireless device measurement may be restricted. A set of subframes may be configured for radio link monitoring and to check if the current connection is reliable enough. The same or a different set of subframes may be introduced for radio resource management, for example, a handover decision. An additional set of subframes may be signaled for the measurement for some neighboring base stations. This configuration may be relatively static and may not change rapidly. Another set of subframes may be configured in the wireless device for channel state information reporting and link adaptation. Two sets of subframes may be signaled to a wireless device for two different channel state information types. For example, one may be for almost blank subframes, and the other may be for normal subframes. This configuration may change dynamically depending on the network configuration.

Figure 10:
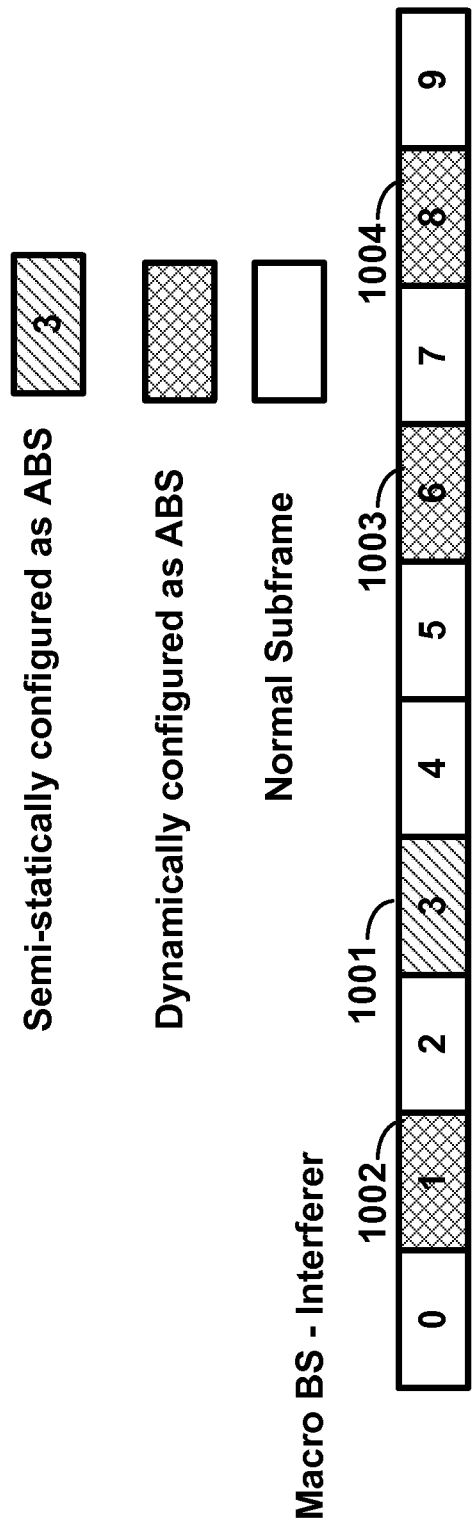
FIG. 10 is a diagram depicting an example wireless device configuration as per an aspect of an embodiment of the present invention.

FIG. 10 illustrates example channel state information bitmaps and an example radio link management bitmap. Subframe 1001 (subframe 3) is semi-statically configured as ABS and therefore it is used for radio link management in a wireless device in a victim base station. Subframes 1002, 1003, and 1004 (subframes 1, 6, and 8) are dynamically configured as ABS subframes. CSI bitmap 1 is used for a first channel state information measurement and CSI bitmap 2 is used for a second channel state information measurement. This is an example, and various configurations and bitmap lengths, such as 40 bits or 70 bits, may also be supported. When there is no X2 interface, a static OAM-based or similar solution may be employed. The same principle of extending coverage of one cell into the area covered by the other may be achieved. In this case, it may be the macro-cell service that needs to be extended into an area covered by the closed femto-cell.

The resource partitioning may reduce interference from the data channel. Interference from the acquisition channels and CRS signal may remain, since these signals may be transmitted for backward compatibility reasons. Subframe time shifting may be utilized in FDD systems to reduce collision of the acquisition channels between base stations of different power classes that require partitioning, but may not be employed in TDD systems. Interference mitigation for the acquisition channels may be needed for cell range expansion to enable the wireless device to detect and acquire a weak cell and then measure and feedback the measurement report to the network, which may be needed for handover and cell range expansion.

CRS interference mitigation may improve system performance. CRS interference may degrade turbo code performance and the overall signal-to-interference-plus-noise radio (SINR). Therefore, the potential gains of cell range expansion may be reduced. Given that acquisition channels and CRS may be broadcast at high power targeting wireless devices at the cell edge, a robust wireless device solution is feasible.

One of the various rationales for the wireless device solution for the acquisition signals and CRS interference mitigation is that interference may be estimated and subtracted so that in the end it may not represent significant interference. Acquisition channels may be transmitted at the same location in cells, which means that the acquisition channels interference may comprise acquisition channels from neighboring interfering cells. This structure may lend itself to a design of an interference canceller. A wireless device receiver first may decode the strongest signal, may perform channel gain estimation toward the interfering cell, may cancel the interfering signal, and may continue the procedure until acquisition channels of the serving cell are acquired.

A similar procedure may be performed to remove CRS interference. The difference may be that CRS tones may also interfere with data tones since interference between CRS tones between high-power and low-power nodes may be reduced by CRS tone shifting. The procedure may be similar. If strong CRS interference is detected, and after the channel gain toward the interfering cell is estimated, the CRS signal may be cancelled. The procedure may be repeated until interfering signals are subtracted.

RRC messages are used to configure wireless device configuration parameters related to almost blank configuration and measurements. An example RRC message configuration in an example embodiment is described in the following paragraphs. A subframe pattern bitmap may indicate the time domain measurement resource restriction pattern for primary or secondary carrier measurements (RSRP, RSRQ and the radio link monitoring). The bitmap length may be, for example, 40 bits. Another subframe bitmap may configure neighbor measurement patterns. A neighbor measurement bitmap along with the list of cells for which the neighbor measurement bitmap is applied may be transmitted to the wireless device. If the list of cells is not included, the wireless device may apply time domain measurement resource restrictions for neighbor cells. Time domain measurement resource restriction patterns may be applicable to neighbor cell RSRP and RSRQ measurements on a carrier frequency indicated by RRC. In an example embodiment, two CSI subframe pattern configuration bitmaps may be transmitted to the wireless device. Each bit map may be 40 bits long. The CSI configuration may include a channel quality index, a rank indicator, a precoding matrix indicator, a combination thereof, or the like.

A base station may broadcast an ABS subframe configuration employing MBSFN (multi-cast, broadcast, single frequency network) subframe configuration broadcast or unicast messages. An example broadcast message is an RRC system information block. MBSFN or ABS subframe configurations may include a radio frame allocation period, a radio frame allocation offset, a subframe allocation bitmap, any combination of these parameters, or the like. A radio frame allocation period may be 1, 2, 4, 8, 16 or 32 frames. A radio frame allocation offset may be a number between 1 to 7 subframes. A subframe allocation bitmap may be for one frame or four frames. Radio frames that contain MBSFN/ABS subframes may occur when equation (SFN mod radio Frame Allocation Period=radio Frame Allocation Offset) is satisfied. Values 1 and 2 may not be applicable to radio frame allocation period when four Frames are used.

According to some of the various aspects of embodiments, a subframe allocation bitmap may define the subframes that are allocated for MBSFN within the radio frame allocation period defined by the radio frame allocation period and the radio frame allocation offset. A subframe allocation bitmap for one frame may be six bits long and for four frames may be 24 bits long. In a bit-map indicating MBSFN/ABS subframe allocation in four consecutive radio frames, a "1" may denote that the corresponding subframe is allocated for MBSFN/ABS. The bitmap may be interpreted as follows: For FDD: Starting from the first radio frame and from the first/leftmost bit in the bitmap, the allocation may apply to subframes #1, #2, #3, #6, #7, and #8 in the sequence of the four radio-frames. For TDD: Starting from the first radio frame and from the first/leftmost bit in the bitmap, the allocation applies to subframes #3, #4, #7, #8, and #9 in the sequence of the four radio-frames. The last four bits may not be used. Uplink subframes may not be allocated.

Other example configurations may be implemented. For example, an MBSFN subframe configuration may be used to introduce ABS subframes and subframes used for scheduling release 10 or above wireless devices. For example, an MBSFN configuration may introduce subframe 1, 3, 6 and 8 as MBSFN subframes in a frame. Then MBSFN subframe 1 may be used for scheduling release 10 or above wireless devices, and MBSFN subframe 3, 6, and 8 may be used as almost blank subframes. Therefore, as seen in this example, MBSFN configuration may indicate other types of subframes in addition to almost blank subframes. In another configuration, a base station may use one or many of MBSFN subframes for broadcasting or multicasting services. In a typical scenario, in which MBSFN may be configured, for example, for four frames, with a period of 40 msec, various configurations for combining ABS, MBSFN, and release 10 or above subframes may be possible. In this specification, ABS subframes may be called special subframes.

According to some of the various aspects of embodiments, special subframes may be configured for the primary carrier (cell) as well as one or more secondary carriers (cells). The configuration parameters for the measurement parameters of the secondary carrier(s) may employ the bitmaps with the same length and format of the configuration parameters of the primary carrier. In an example embodiment, the configuration parameters of special subframes for one or more secondary carriers may be the same as the configuration parameters for the special subframe configuration of the primary carrier.

According to some of the various aspects of embodiments, non-backward compatible carriers may be configured with special subframes. In a non-backward compatible carrier special subframe, no common reference signal may be transmitted during the special subframe. Or, data and reference signals in a non-backward compatible carrier special subframe may be transmitted at a substantially lower power to ensure that no interference (to other cells) is observed during the special subframe.

Example embodiments of the invention may enable channel state information feedback in wireless communication systems. Other example embodiments may comprise a non-transitory tangible computer readable media comprising instructions executable by one or more processors to cause channel state information feedback in wireless communication systems. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable channel state information feedback. The device may include processors, memory, interfaces, and/or the like. Other example embodiments may comprise communication networks comprising devices such as base stations, wireless devices (or user equipment: UE), servers, switches, antennas, and/or the like.

Co-channel deployments may be of interest due to cost effectiveness and high spectral efficiency. Resource partitioning may effectively mitigate interference from the data channel. However, interference from the acquisition channels, CRS signal, and control channels (including a control format indicator channel) may remain, since these signals may be needed to be transmitted for backward compatibility reasons. Subframe time shifting may be utilized in FDD systems to avoid collision of the acquisition channels between base stations of different power classes that require partitioning. Subframe time shifting may not be necessary in TDD systems. There may be limited network solutions for CRS interference mitigation for either FDD or TDD systems. Without additional interference mitigation of the acquisition channels, CRS, and control channels (including the control format indicator channel), limited medium bias values (for example, 6-10 dB) for handover may be supported. This may limit the potential for cell range expansion.

Interference mitigation for the acquisition channels may be needed for cell range expansion. Interference mitigation may enable wireless devices to detect and acquire a weak cell and then measure and feedback the measurement report to the network.

CRS interference mitigation may have a role in system performance. Strong CRS interference, even though present on a relatively small fraction of resource elements, may degrade turbo code performance and the overall signal-to-interference-plus-noise ratio (SINR). The potential gains of cell range expansion may be reduced. The control format indicator channel may carry important information without which the wireless device may not be able to decode the control information. Strong interference on the control format indicator channel may result in loss of information carried on this channel and may cause a wireless device to lose the ability to decode other control channels carrying scheduling and other related information.

According to some of the various aspects of embodiments, a wireless device solution may be feasible given that acquisition channels, CRS, and/or the control format indicator channel may be broadcast at a high power targeting wireless devices at the cell edge. Interference may be estimated and subtracted so that it may not represent significant interference for the acquisition signals, CRS, and the control format indicator channel. Acquisition channels may be transmitted at the same radio resource location in cells. The acquisition channels interference may comprise the acquisition channels from the neighboring interfering cells. This structure may lend itself to a design of an interference canceller. A wireless device receiver may first decode one of the strongest signals, may perform channel gain estimation toward the interfering cell, may cancel the interfering signal, and may continue the procedure until acquisition channels of the serving cell are acquired.

A similar procedure may be performed to remove CRS interference. The CRS tones may also interfere with data tones since interference between CRS tones between high- and low-power nodes may be avoided/reduced by CRS tone shifting. If strong CRS interference is detected, and after the channel gain toward the interfering cell is estimated, the CRS signal may be cancelled. The procedure may be repeated until interfering signals are subtracted.

According to some of the various aspects of embodiments, the control format indicator channel may be transmitted at the same location in cells. The control format indicator channel's interference may comprise the control format indicator channel from the neighboring interfering cells. This structure may lend itself to a design of an interference canceller. A wireless device receiver may first decode one of the strongest signals, may perform channel gain estimation toward the interfering cell, may cancel the interfering signal, and may continue the procedure until the control format indicator channel of the serving cell is decoded. There is a need to develop mechanisms for processing broadcast channels, for example, in hierarchical networks. A different signal processing mechanism may be needed compared with traditional methods when there is strong co-channel interference among base stations. The mechanisms may be different than traditional methods since the signal patterns may be known or the wireless device may able to determine interference patterns before an interference cancellation process starts. Embodiments of the present invention provide mechanisms to process received signals and to obtain broadcast messages and signals.

In an example embodiment, resource partitioning mechanisms such as ABS subframe configurations may be used for data channels. Different interfering signals may be transmitted at different times employing an ABS configuration among interfering base stations. In an example embodiment, resource partitioning may be performed in frequency domains, for example different interfering ePDCCH and/or PDCCH may be transmitted in different frequency bands. Simulation results show that advanced interference cancellation may be effective on control format indicator channel and/or physical broadcast channels, while the same techniques may not be applicable to other channels such as (e)PDCCH and/or PDSCH. Signal pattern may have more limited possibilities for control format indicator channel and/or physical broadcast channels. The number of iterations required for interference cancellation for control format indicator channel and physical broadcast channels may be limited. At least for the above reasons, interference cancellation is applied to control format indicator channel and/or physical broadcast channels.

The same or similar approaches may not be appropriate for all control channels, (e.g., control channels carrying scheduling information) and/or data channels. The reason may be that such control and/or data channels may be scrambled with the identity of a target wireless device, and in order for a wireless device to cancel the interference of such channels, the wireless device may need to try a very large number of hypotheses considering the information being transmitted to potential wireless identifiers in the neighboring cell. This may require a large amount of computational complexity, and may not be practical. The interference cancellation for synchronization signals may require a limited number of correlations to detect interfering synchronization signal. This process may be simpler than interference cancellation for (e)PDCCH and/or PDSCH. I mechanism is introduced for interference cancellation of synchronization signal.

Figure 11:
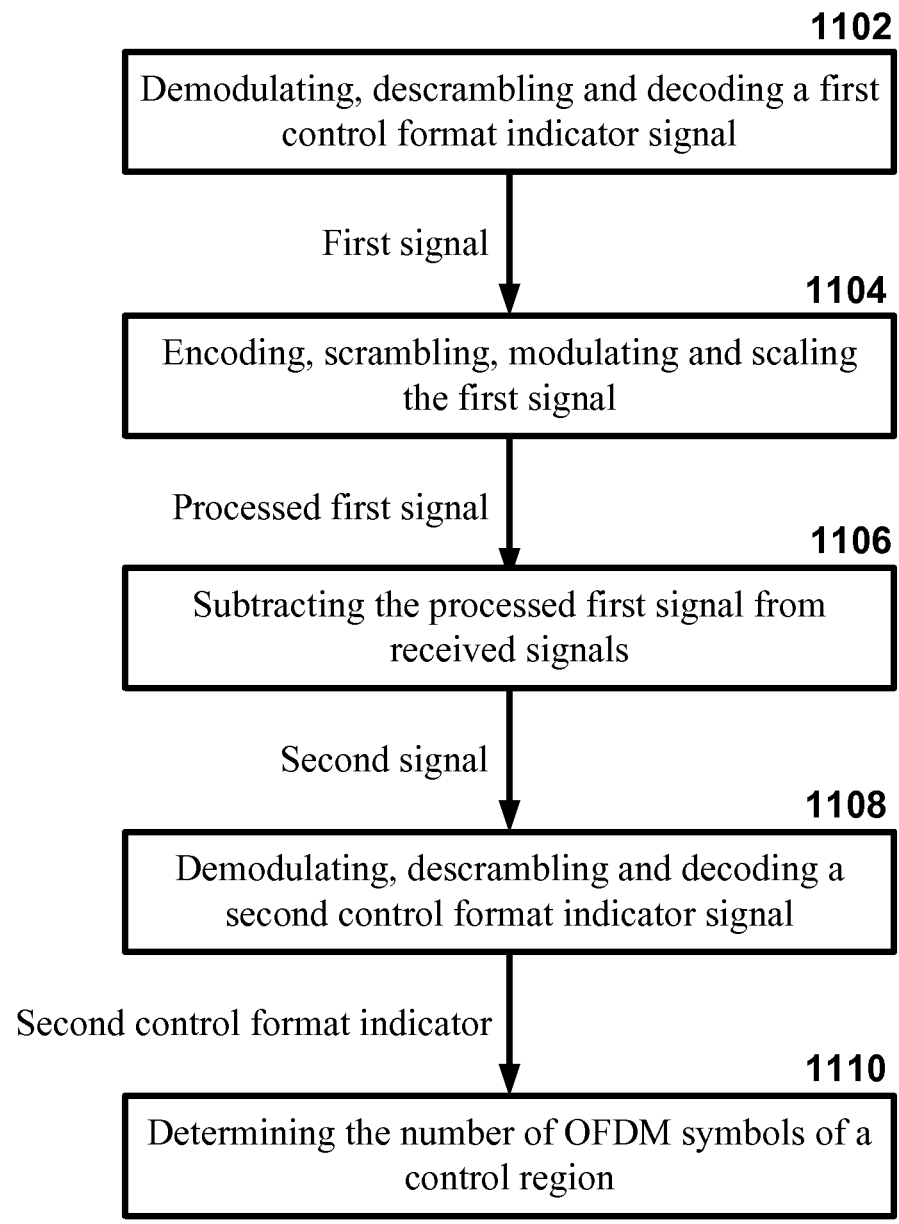
FIG. 11 is a flow chart illustrating an example processing of control format indicator signal as per an aspect of an embodiment of the present invention.

FIG. 11 is a flow chart illustrating an example processing of control format indicator signal as per an aspect of an embodiment of the present invention. According to some of the various aspects of embodiments, a wireless device may demodulate, descramble and decode a first control format indicator signal to generate a first signal as shown in 1102. The first control format indicator signal may be received from a first base station on a plurality of OFDM subcarriers in a first OFDM symbol of a first subframe in a plurality of subframes. The wireless device may process the first signal. The processing of the first signal may comprise encoding, scrambling, modulating and scaling the first signal as shown in 1104. The wireless device may subtract the processed first signal from received signals on the plurality of OFDM subcarriers in the first OFDM symbol of the first subframe to generate a second signal as shown in 1106. The wireless device may process the second signal. The processing of the second signal may comprise demodulating, descrambling and decoding a second control format indicator signal to generate a second control format indicator as shown in 1108. The second control format indicator signal may be received from a second base station in the first OFDM symbol of the first subframe. The wireless device may determine the number of OFDM symbols of a control region of the second base station based on the second control format indicator as shown in 1110.

According to some of the various aspects of embodiments, the second base station may be of a different base station type than the first base station. The first base station type may be one of the following: a macro base station type, a pico base station type, a femto base station type with open access, and a femto base station type with close subscriber group access. The second base station type may be one of the following: a macro base station type, a pico base station type, a femto base station type with open access, and a femto base station type with close subscriber group access. The second control format indicator may comprise two bits of information. The second control format indicator signal may be encoded, by the second base station, employing a repetition code. The first control format indicator signal may be received over sixteen modulation symbols. Those skilled in the art will recognize that the first control format indicator signal may be received over different amount of modulation symbols in accordance with various systems.

Figure 12:
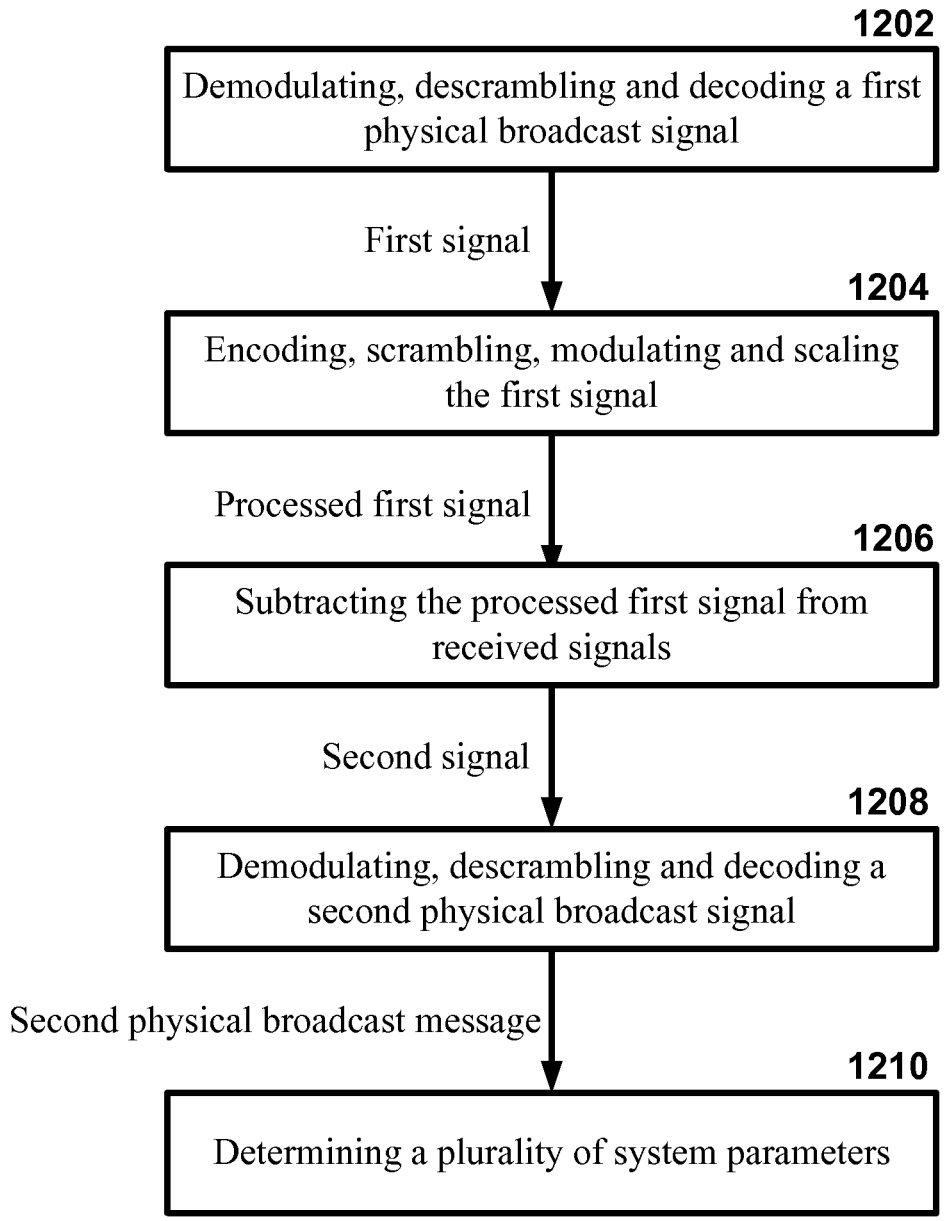
FIG. 12 is a flow chart illustrating an example processing of physical broadcast signal as per an aspect of an embodiment of the present invention.

FIG. 12 is a flow chart illustrating an example processing of physical broadcast signal as per an aspect of an embodiment of the present invention. According to some of the various aspects of embodiments, a wireless device may demodulate, descramble and decode a first physical broadcast signal to generate a first signal as shown in 1202. The first physical broadcast signal may be received from a first base station on a plurality of OFDM subcarriers substantially in the center of a frequency band of a carrier in a plurality of OFDM symbols of a subset of subframes in a plurality of subframes. The term substantially is used to indicate possible inaccuracies in the frequency of frequency synthesizers. The signal is practically considered in the center of the frequency band. The wireless device may process the first signal. The processing of the first signal may comprise encoding, scrambling, modulating and scaling the first signal as shown in 1204. The wireless device may subtract the processed first signal from received signals on the plurality of OFDM subcarriers in the plurality of OFDM symbols of the subset of subframes to generate a second signal as shown in 1206. The wireless device may process the second signal. The processing of the second signal comprising demodulating, descrambling and decoding a second physical broadcast signal to generate a second physical broadcast message as shown in 1208. The second physical broadcast signal may be received from a second base station in the plurality of OFDM symbols of the subset of subframes. The wireless device may determine a plurality of system parameters of the second base station based on the second physical broadcast message as shown in 1210.

According to some of the various aspects of embodiments, the second base station may be of a different base station type than the first base station. The first base station type may be one of the following: a macro base station type, a pico base station type, a femto base station type with open access, and a femto base station type with close subscriber group access. The second base station type may be one of the following: a macro base station type, a pico base station type, a femto base station type with open access, and a femto base station type with close subscriber group access. The first physical broadcast signal reception may reoccur periodically with a fix period, for example every 40 msec. The first physical broadcast signal may be received over seventy two OFDM subcarriers substantially in the center of a carrier. The plurality of system parameters may comprise at least one of: system bandwidth information, HARQ indicator channel structure information, and eight most significant bits of system frame number. The second physical broadcast signal may be encoded, by the second base station, employing a convolutional code and a repetition code. Those skilled in the art will recognize that physical broadcast signal(s) may be encoded using other techniques. The second physical broadcast message may comprise fourteen bits of information. The second physical broadcast message may comprise a master information block.

According to some of the various aspects of embodiments, a wireless device may correlate received signals on a first plurality of OFDM subcarriers substantially in the center of a frequency band of a carrier in a first subset of OFDM symbols with a first plurality of predetermined primary synchronization signals to produce a first plurality of correlation values. In one example embodiment, the correlation process may comprise a summation of a plurality of multiplications. In another example implementation, correlation may be performed by hardware, firmware, software in combination with hardware, and/or an electronic circuit, for example, by a matched filter, DSP processor and/or the like. Other examples of correlation mechanisms may be implemented. Correlation may be of any type of correlation and may not be limited to above embodiments. Correlation process may be any type of mechanisms that detects association, similarity, connection, and/or relationship between two signals.

The wireless device may identify based at least in part on the first plurality of correlation values, a first primary synchronization signal in the first plurality of predetermined primary synchronization signals as a primary synchronization signal transmitted by a first base station. The wireless device may process the first primary synchronization signal. The processing of the first primary synchronization signal may comprise scaling the first primary synchronization signal by a scaling factor that depends, at least in part, on a correlation value corresponding to the first primary synchronization signal. The wireless device may subtract the processed first primary synchronization signal from received signals on the first plurality of OFDM subcarriers in the first subset of OFDM symbols to generate a first updated received signal. The wireless device may correlate the first updated received signal with a second plurality of predetermined primary synchronization signals to produce a second plurality of correlation values. The wireless device may identify based at least in part on the second plurality of correlation values, a second primary synchronization signal as a primary synchronization signal transmitted by a second base station.

The wireless device may correlate received signals on a second plurality of OFDM subcarriers substantially in the center of the frequency band of the carrier in a second subset of OFDM symbols with a first plurality of predetermined secondary synchronization signals to produce a third plurality of correlation values. The wireless device may identify based at least in part on the third plurality of correlation values, a first secondary synchronization signal in the first plurality of predetermined secondary synchronization signals as a secondary synchronization signal transmitted by the first base station. The wireless device may process the first secondary synchronization signal. The processing of the first secondary synchronization signal may comprise scaling by a scaling factor that depends, at least in part, on a correlation value corresponding to the first secondary synchronization signal.

The wireless device may subtract the processed first secondary synchronization signal from received signals on the second plurality of OFDM subcarriers in the second subset of OFDM symbols to generate a second updated received signal. The wireless device may correlate the second updated received signal with a second plurality of predetermined secondary synchronization signals to produce a fourth plurality of correlation values. The wireless device may identify based at least in part on the fourth plurality of correlation values, a second secondary synchronization signal in the second plurality of predetermined secondary synchronization signals as a secondary synchronization signal transmitted by the second base station. The wireless device may obtain frame and subframe timing information of the second base station employing the second primary synchronization signal and the second secondary synchronization signal.

According to some of the various aspects of embodiments, the first primary synchronization signal may have a highest correlation value among the first plurality of correlation values. The second primary synchronization signal may have a highest correlation value among the second plurality of correlation values. The first secondary synchronization signal may have a highest correlation value among the third plurality of correlation values. The second secondary synchronization signal may have a highest correlation value among the fourth plurality of correlation values. The first plurality of predetermined secondary synchronization signals may depend, at least in part, on the first primary synchronization signal. The second plurality of predetermined secondary synchronization signals may depend, at least in part, on the second primary synchronization signal.

Figure 13:
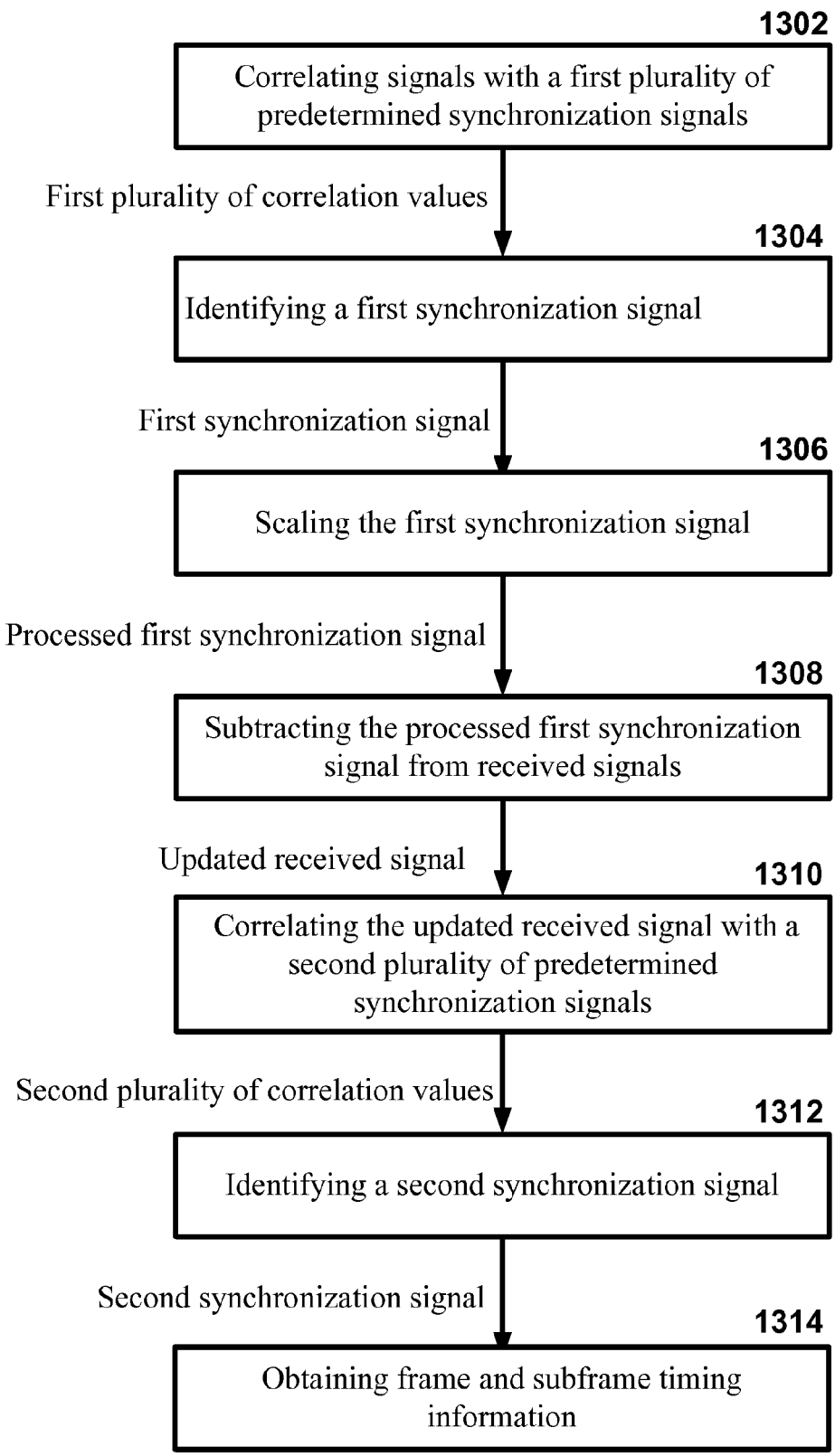
FIG. 13 is a flow chart illustrating an example processing of synchronization signal as per an aspect of an embodiment of the present invention.

FIG. 13 is a flow chart illustrating an example processing of synchronization signal as per an aspect of an embodiment of the present invention. According to some of the various aspects of embodiments, a wireless device may correlate received signals on a plurality of OFDM subcarriers substantially in the center of a frequency band of a carrier in a subset of OFDM symbols with a first plurality of predetermined synchronization signals to produce a first plurality of correlation values as shown in 1302. The wireless device may identify based at least in part on the first plurality of correlation values, a first synchronization signal in the first plurality of predetermined synchronization signals as a synchronization signal transmitted by a first base station as shown in 1304. The wireless device may process the first synchronization signal. The processing of the first synchronization signal may comprise scaling the first synchronization signal by a scaling factor that depends, at least in part, on a correlation value corresponding to the first synchronization signal as shown in 1306. The wireless device may subtract the processed first synchronization signal from received signals on the plurality of OFDM subcarriers in the subset of OFDM symbols to generate an updated received signal as shown in 1308. The wireless device may correlate the updated received signal with a second plurality of predetermined synchronization signals to produce a second plurality of correlation values as shown in 1310. The wireless device may identify based at least in part on the second plurality of correlation values, a second synchronization signal as a synchronization signal transmitted by a second base station as shown in 1312. The wireless device may obtain frame and subframe timing information of the second base station employing the second synchronization signal as shown in 1314.

The first base station type may be of a different type than the second base station type. The first base station type may be one of the following: a macro base station type, a pico base station type, a femto base station type with open access, and a femto base station type with close subscriber group access. The second base station type may be one of the following: macro base station type, a pico base station type, a femto base station type with open access, and a femto base station type with close subscriber group access.

The first synchronization signal may have a highest correlation value among the first plurality of correlation values. The second synchronization signal may have a highest correlation value among the second plurality of correlation values. The plurality of synchronization signals may be transmitted over seventy-two OFDM subcarriers substantially in the center of the carrier. The plurality of synchronization signals may determine a physical identifier of a carrier on which the plurality of synchronization signals are transmitted. The scaling factor may be a function of characteristics of a wireless channel over which the plurality of synchronization signals are transmitted.

A similar procedure may be performed to remove CRS interference. The CRS tones may also interfere with data tones since interference between CRS tones between high- and low-power nodes may be avoided by CRS tone shifting. If strong CRS interference is detected, and after the channel gain toward the interfering cell is estimated, the CRS signal may be cancelled. The procedure may be repeated until most of the interfering signals are subtracted. However, the problem of reliable channel quality information (CQI) feedback for data transmission may remain, depending on whether CRS tones interfere with data tones or not, and whether the interfering base station transmits or does not transmit data on the corresponding subframe (e.g., whether the corresponding subframe is an almost blank subframe for the interfering base station or not). Based on these alternatives, at least four different cases may be considered for CQI computation:

1. CRS tones of the interfering base station may overlap with the CRS tones of the interfered base station, and the interfering base station transmits data on the corresponding subframe. In this case, there may be no need for post processing of the interference values estimated on the CRS tones. The interference seen on the data tones may most likely be similar to the interference seen on the CRS tones. The wireless device may use the interference estimate obtained from the CRS tones directly with the channel estimates obtained for the serving base station from the CRS tones to compute the CQI value and may feed it back to its serving base station.

2. CRS tones of the interfering base station may overlap with CRS tones of the interfered base station, but the interfering base station may not transmit data on the corresponding subframe (e.g., the corresponding subframe is an almost blank subframe of the interfering base station). In this case, the interference estimated on the CRS tones may include interference from the interfering base station, but this interference may not be present on the data tones. So the interference value may be overestimated. The wireless device may separately estimate the interference contribution of the interfering base station, and may subtract it from the total interference measured on the CRS tones to obtain a more accurate estimate of the interference observed on the data tones. This more accurate interference estimate may be used along with the channel estimate of the serving base station obtained from the CRS tones to compute the CQI value.

3. CRS tones of the interfering base station may not overlap with CRS tones of the interfered base station, and the interfering base station transmits data on the corresponding subframe. In this case, depending on the signals transmitted by the interfering base station on the CRS tones of the interfered base station, there may be at least two options. If the interfering base station punctures these tones and does not transmit a signal on these tones (to allow for more accurate channel estimation at the interfered base station), then the interference value estimated on the CRS tones may be an underestimate and may need to be adjusted before using the interference value estimate in a CQI computation. This adjustment may involve separate estimation of the potential interference from the interfering base station and adding the separate estimation to the total interference estimated on the CRS tones of the interfered base station. If on the other hand, the interfering base station transmits data on the CRS tones of the interfered base station, then the interference estimate on the CRS tones of the interfered base station may be accurate and there may be no need for further adjustment for the CQI computation.

4. CRS tones of the interfering base station may not overlap with CRS tones of the interfered base station, and the interfering base station may not transmit data on the corresponding subframe. In this case, there may be no underestimation or overestimation of the interference on the CRS tones of the interfered base station. Therefore, there may be no need for further adjustment for the CQI computation.

Figure 14:
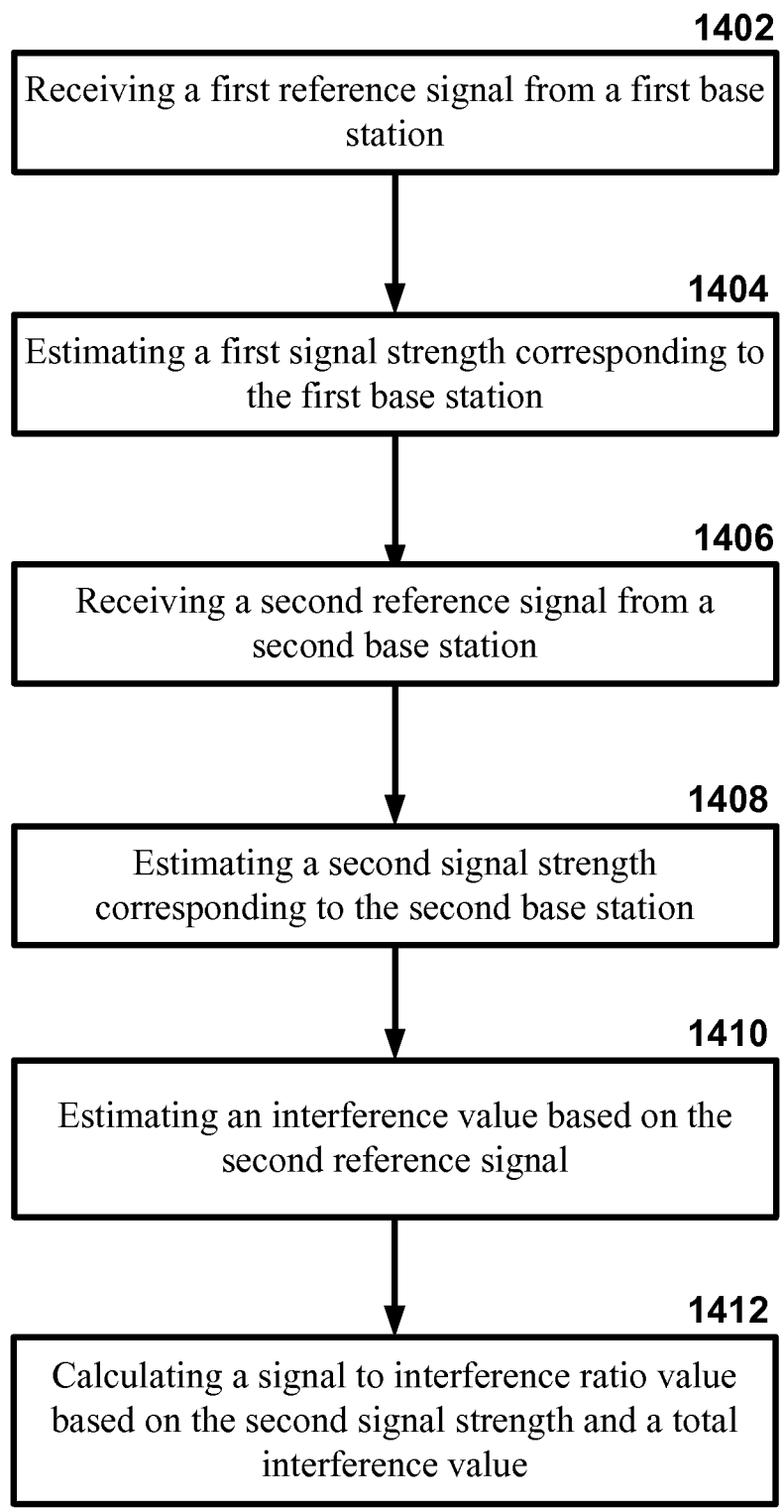
FIG. 14 is a flow chart illustrating an example processing of reference signals as per an aspect of an embodiment of the present invention.

FIG. 14 is a flow chart illustrating an example processing of reference signals as per an aspect of an embodiment of the present invention. A wireless device may receive a first reference signal from a first base station in the plurality of base stations on a first plurality of OFDM resources in a first subframe in the plurality of subframes as shown in 1402. The first plurality of OFDM resources may depend, at least in part, on a first base station identifier of the first base station. The wireless device may estimate a first signal strength corresponding to the first base station based on the received first reference signal as shown in 1404.

The wireless device may receive a second reference signal from a second base station, on a second plurality of OFDM resources in the first subframe as shown in 1406. The second plurality of OFDM resources may depend, at least in part, on a second base station identifier of the second base station. The wireless device may estimate a second signal strength corresponding to the second base station based on the received second reference signal as shown in 1408. The wireless device may estimate an interference value on the second plurality of OFDM resources based, at least in part, on the second reference signal as shown in 1410. The wireless device may calculate a signal to interference ratio value based on the second signal strength and a total interference value as shown in 1412. If the first plurality of OFDM resources overlap with the second plurality of OFDM resources, the total interference value may be computed based upon the interference value. If the first plurality of OFDM resources do not overlap with the second plurality of OFDM resources, the total interference value may be computed based upon the interference value plus the first signal strength.

According to some of the various aspects of embodiments, the wireless device may receive a first reference signal from a first base station in the plurality of base stations on a first plurality of OFDM resources in a first subframe in the plurality of subframes. The first plurality of OFDM resources may depend, at least in part, on a first base station identifier of the first base station. The wireless device may estimate a first signal strength corresponding to the first base station based on the received first reference signal. The wireless device may receive a second reference signal from a second base station in the plurality of base stations, on a second plurality of OFDM resources in the first subframe. The second plurality of OFDM resources depend, at least in part, on a second base station identifier of the second base station. The wireless device may estimate a second signal strength corresponding to the second base station based on the received second reference signal.

The wireless device may estimate an interference value on the second plurality of OFDM resources based, at least in part, on the second reference signal. The wireless device may estimate a signal to interference ratio value based on the second signal strength and a total interference value. If the first plurality of OFDM resources do not overlap with the second plurality of OFDM resources, the total interference value may be computed based upon the interference value. If the first plurality of OFDM resources overlap with the second plurality of OFDM resources, the total interference value may be computed based upon the interference value minus the first signal strength.

According to some of the various aspects of embodiments, the first base station may transmit data to a plurality of wireless devices on the first subframe. The first base station may not transmit data on the first subframe. The first base station may transmit radio signals at a substantially higher power than the second base station. The second base station may transmit radio signals at a substantially higher power than the first base station. The first base station may be a macro base station. The first base station may be a pico base station. The first base station may be a femto base station with open access. The first base station may be a femto base station with close subscriber group access. The second base station may be a macro base station. The second base station may be a pico base station. The second base station may be a femto base station with open access. The second base station may be a femto base station with close subscriber group access.

The first reference signal may be a common reference signal. The second reference signal may be a common reference signal. The first reference signal may be a channel state information reference signal. The second reference signal may be a channel state information reference signal. The first signal strength may be a short term signal strength value obtained from the most recent observation. The first signal strength may be a long term signal strength value obtained from averaging a plurality of recent observations. The second signal strength may be a short term signal strength value obtained from the most recent observation. The second signal strength may be a long term signal strength value obtained from averaging a plurality of recent observations. The interference value may be a short term interference value obtained from the most recent observation. The interference value may be a long term interference value obtained from averaging a plurality of recent observations.

The control format indicator channel may be transmitted at the same location in cells, which means that the control format indicator channel's interference may comprise the control format indicator channel from the neighboring interfering cells. This structure may lend itself to a design of an interference canceller. A wireless device receiver may first decode one of the strongest signals, may perform channel gain estimation toward the interfering cell, may cancel the interfering signal, and may continue the procedure until control format indicator channel of the serving cell is decoded.

The same or similar approaches may not be appropriate for other control channels, (e.g., control channels carrying scheduling information). The reason may be that such control channels may be scrambled with the identity of a target wireless device, and in order for a wireless device to cancel the interference of such channels, the wireless device may need to try a very large number of hypotheses considering the information being transmitted to potential wireless identifiers in the neighboring cell. This may require a large amount of computational complexity, and may not be practical.

The control region of most packet switched technologies may be a shared region in the sense that control information for many different wireless devices may be transmitted on the same resources. This may reduce the amount of overhead for such systems, especially with dynamic scheduling of the wireless devices, in which, in a given subframe, a small number of active wireless devices may be scheduled. Each wireless device may monitor a portion or the entire control region for potential control channel transmissions targeting that particular wireless device. On the other hand, many technologies may use a mechanism such as a hashing mechanism to limit the number of the decode hypotheses of the wireless devices. As a very simple example, it may be specified that wireless devices with the wireless device identifier from the first half of the entire wireless device identifiers space may expect control information on the first half of the resources of entire the control region, and wireless devices with the wireless device identifier from the second half of the entire wireless device identifiers space may expect control information on the second half of the resources of entire the control region. With this rule, the number of decode hypotheses of any wireless device in the system may be reduced by half. Practical systems and technologies may use more sophisticated hashing mechanisms to further reduce the number of decode hypotheses of the wireless devices.

Following the example given above, an alternate method of mitigating control channel information which is based on base station coordination and may not require wireless device involvement or may reduce wireless device involvement may be considered. In this alternate method, base stations that are potential interferers to each other may decide to coordinate the wireless device identifiers that they assigned to their served wireless devices such that the corresponding control transmissions of the two base stations may not overlap in time frequency resources or may have a reduced overlap in time frequency resources. For the simple example provided above, it may be necessary for the two base stations to agree that one of them uses the first half of the wireless identifiers space and the other base station uses the second half of the wireless identifiers space. With this agreement, the control transmissions of the first base station may take place on the first half of the resources of the control region and the control transmissions of the second base station may take place on the second half of the resources of the control region. This may avoid or reduce overlap and thus reduce interference between each of the base stations.

Practical systems may use more sophisticated hashing algorithms for the mapping between wireless device identifiers and control region resources. Nevertheless, wireless device identifier partitioning algorithms similar to the scheme described above may be devised so that wireless device identifier space may be partitioned such that the amount of interfering control resources between base stations may be reduced.

Figure 15:
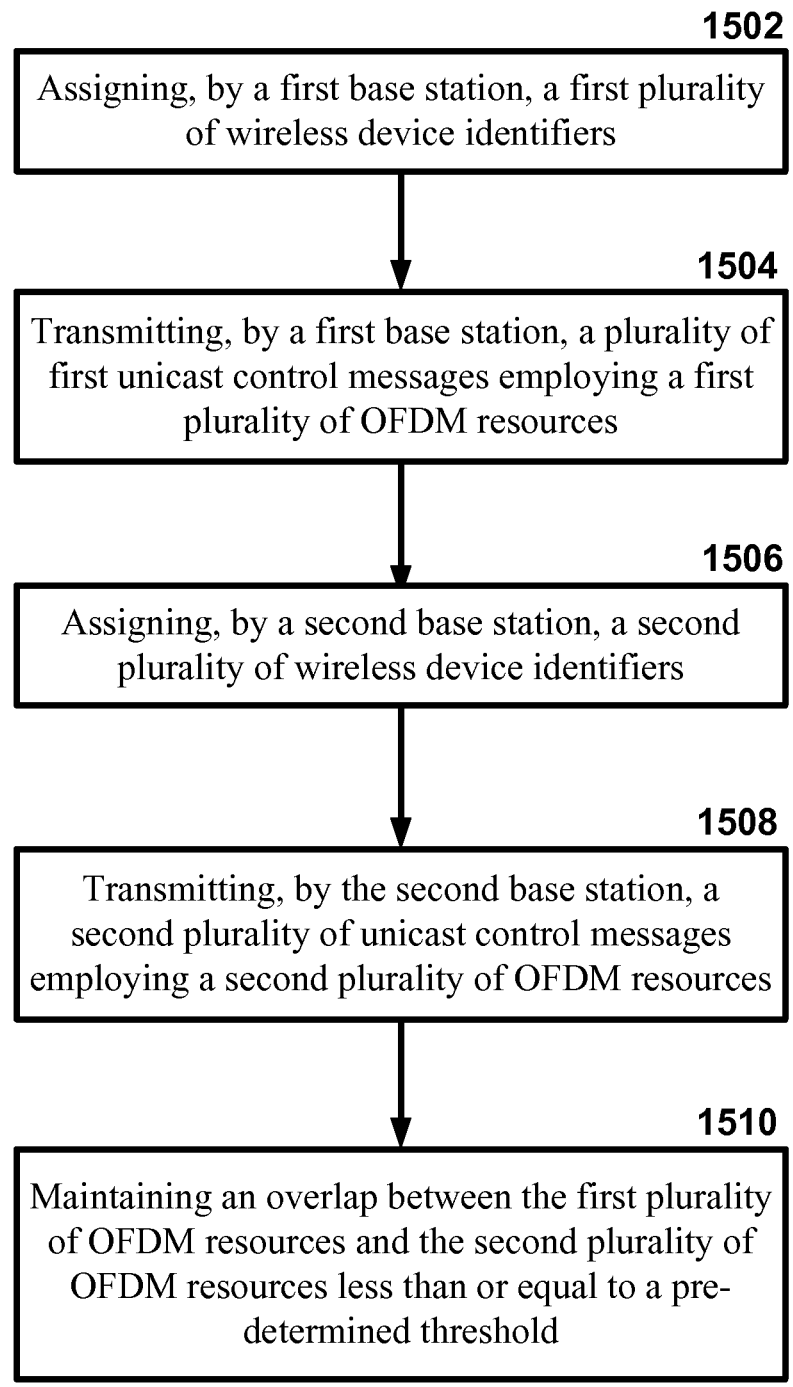
FIG. 15 is a flow chart illustrating transmission of control messages as per an aspect of an embodiment of the present invention.

FIG. 15 is a flow chart illustrating transmission of control messages as per an aspect of an embodiment of the present invention. A first base station may be configured with a first plurality of wireless device identifiers. A second base station may be configured with a second plurality of wireless device identifiers. For example, a first plurality of wireless device identifiers may be selected and then assigned to a first base station, and a second plurality of wireless device identifiers may be selected and then assigned to a second base station. In an example implementation, the selection and/or assignment of wireless device identifiers to the base stations may be done by a network administrator, network management system, and/or the like. The list of selected wireless device identifiers may be communicated to the base station via a management interface. A base station assigns a wireless device identifier from the pool of wireless device identifiers configured in that base station to wireless device identifiers connected to the base station.

A first base station may assign a first plurality of wireless device identifiers to a first plurality of wireless devices in connected mode as shown in 1502. The first base station may transmit a plurality of first unicast and/or broadcast control messages to a first subset of the first plurality of wireless devices employing a first plurality of OFDM resources in a first subframe of the first base station as shown in 1504. The first plurality of OFDM resources may depend, at least in part, on wireless device identifiers of the first subset of the first plurality of wireless devices.

A second base station may assign a second plurality of wireless device identifiers to a second plurality of wireless devices in connected mode as shown in 1506. The second base station may transmit a second plurality of unicast and/or broadcast control messages to a second subset of the second plurality of wireless devices employing a second plurality of OFDM resources in a second subframe of the second base station as shown in 1508. The second subframe being transmitted substantially simultaneously with the first subframe. The base stations frame and subframe transmission may be synchronized by GPS, packet based synchronization mechanisms, and/or the like. Synchronization errors may be inevitable due to inaccuracy in the synchronization techniques used to achieve synchronization among base stations. Synchronization errors may be below a small fraction of subframe duration. The second plurality of OFDM resources may depend, at least in part, on wireless device identifiers of the second subset of the second plurality of wireless devices. The first plurality of wireless device identifiers and the second plurality of wireless device identifiers may be configured to maintain overlap between the first plurality of OFDM resources and the second plurality of OFDM resources is at or below a pre-determined threshold as shown in 1510. In an example embodiment, average overlap over a plurality of subframes may be at or below a threshold. In another example embodiment for most (for example above a pre-determined percentage) of subframes, the overlap may be at or below a threshold. In an example embodiment, overall overlap between OFDM resources of the control regions of the base stations may be reduced to reduce interference in the control region. For example, the reduction in overlap could be on each individual frame, or could be a statistical reduction of overlap over a plurality of frames. Other embodiments to reduce overall overlap may be implemented.

The first base station may be of a different base station type than the second base station. The pre-determined threshold is zero or larger. In some example embodiments, the pre-determined threshold could be one of the following: below ten percent of the smaller of the first plurality of OFDM resources and the second plurality of OFDM resources, below twenty percent of the smaller of the first plurality of OFDM resources and the second plurality of OFDM resources, or below fifty percent of the smaller of the first plurality of OFDM resources and the second plurality of OFDM resources. In other words, the pre-determined threshold may be between ten to fifty percent of the smaller of said first plurality of OFDM resources and said second plurality of OFDM resources. However, those skilled in the art will recognize that other threshold values may be employed accordingly depending upon the constraints of any particular embodiment.

At least one unicast message in the first plurality of unicast control messages and the second plurality of unicast control messages may comprise at least one of the following: a resource identifier, a modulation and coding format indicator, a HARQ process identifier, a redundancy version, a transmission mode indicator, and an uplink power control indicator. The transmission mode indicator may be employed, by a wireless device, to determine a transmission mode from a plurality of transmission modes. The plurality of transmission modes may be one of: a transmit diversity mode, a cyclic delay diversity mode, a spatial multiplexing mode, a beamforming mode, and a precoding mode. The uplink power control command may be an absolute power control command and a relative power control command. The uplink power control indicator may be a single power control command for a single wireless device. The uplink power control indicator may comprise a plurality of power control commands for a plurality of wireless devices. At least one power control command in the plurality of power control commands may be an absolute power control command or a relative power control command.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be $\{0, 1\}$ or $\{0, 1, 2, 3\}$. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) $\{5, \{7\}, \{8\}, \text{or} \{7, 8, \ldots, v+6\}$, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b)

Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula (s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula (s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 40 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 40 ms PBCH TTI may indicate 2 least significant bits (within 40 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VOIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
    a) receiving, by a wireless device, a first reference signal from a first base station on a first plurality of OFDM resources in a first subframe in a plurality of subframes, said first plurality of OFDM resources depending at least in part on a first base station identifier of said first base station;
    b) estimating, by said wireless device, a first signal strength corresponding to said first base station based on said received first reference signal;
    c) receiving, by said wireless device, a second reference signal from a second base station, on a second plurality of OFDM resources in said first subframe, said second plurality of OFDM resources depending at least in part on a second base station identifier of said second base station;
    d) estimating, by said wireless device, a second signal strength corresponding to said second base station based on said received second reference signal;
    e) estimating, by said wireless device, an interference value on said second plurality of OFDM resources based at least in part on said second reference signal; and
    f) calculating, by said wireless device, a signal to interference ratio value based on said second signal strength and a total interference value, wherein:
        i) if said first plurality of OFDM resources overlap with said second plurality of OFDM resources, said total interference value is computed based upon said interference value; and
        ii) if said first plurality of OFDM resources do not overlap with said second plurality of OFDM resources, said total interference value is computed based upon said interference value plus said first signal strength.

2. The method of claim 1, wherein radio signals are received from said first base station at a higher power than radio signals received from said second base station.

3. The method of claim 1, wherein said second base station transmits radio signals at a higher power than said first base station.

4. The method of claims 1, wherein said first base station type is one of the following:
    a) a macro base station type;
    b) a pico base station type;
    c) a femto base station type with open access; and
    d) a femto base station type with close subscriber group access.

5. The method of claim 1, wherein said second base station type is one of the following:
    a) a macro base station type;
    b) a pico base station type;

c) a femto base station type with open access; and
d) a femto base station type with close subscriber group access.

6. The method of claim 1, wherein said first reference signal is one of the following:
   a) a common reference signal; and
   b) a channel state information reference signal.

7. The method of claim 1, wherein said second reference signal is one of the following:
   a) a common reference signal; and
   b) a channel state information reference signal.

8. The method of claim 1, wherein said first signal strength is represented by one of the following:
   a) a short term signal strength value obtained from a most recent observation; and
   b) a long term signal strength value obtained by averaging a plurality of recent observations.

9. The method of claim 1, wherein said second signal strength is represented by one of the following:
   a) a short term signal strength value obtained from a most recent observation; and
   b) a long term signal strength value obtained by averaging a plurality of recent observations.

10. The method of claim 1, wherein said interference value is one of the following:
    a) a short term interference value obtained from a most recent observation; and
    b) a long term interference value obtained by averaging a plurality of recent observations.

11. A method comprising:
    a) receiving, by a wireless device, a first reference signal from a first base station on a first plurality of OFDM resources in a first subframe in a plurality of subframes, said first plurality of OFDM resources depending at least in part on a first base station identifier of said first base station;
    b) estimating, by said wireless device, a first signal strength corresponding to said first base station based on said received first reference signal;
    c) receiving, by said wireless device, a second reference signal from a second base station, on a second plurality of OFDM resources in said first subframe, said second plurality of OFDM resources depending at least in part on a second base station identifier of said second base station;
    d) estimating, by said wireless device, a second signal strength corresponding to said second base station based on said received second reference signal;
    e) estimating, by said wireless device, an interference value on said second plurality of OFDM resources based at least in part on said second reference signal; and
    f) calculating, by said wireless device, a signal to interference ratio value based on said second signal strength and a total interference value, wherein:
       i) if said first plurality of OFDM resources do not overlap with said second plurality of OFDM resources, said total interference value is computed based upon said interference value; and
       ii) if said first plurality of OFDM resources overlap with said second plurality of OFDM resources, said total interference value is computed based upon said interference value minus said first signal strength.

12. The method of claim 11, wherein radio signals are received from said first base station at a higher power than radio signals received from said second base station.

13. The method of claim 11, wherein said second base station transmits radio signals at a higher power than said first base station.

14. The method of claim 11, wherein said first base station type is one of the following:
    a) a macro base station type;
    b) a pico base station type;
    c) a femto base station type with open access; and
    d) a femto base station type with close subscriber group access.

15. The method of claim 11, wherein said first reference signal is one of the following:
    a) a common reference signal; and
    b) a channel state information reference signal.

16. The method of claim 11, wherein said second reference signal is one of the following:
    a) a common reference signal; and
    b) a channel state information reference signal.

17. A wireless device comprising:
    a) one or more communication interfaces;
    b) one or more processors; and
    c) memory storing instructions that, when executed, cause the wireless device to:
       i) receive a first reference signal from a first base station on a first plurality of OFDM resources in a first subframe in a plurality of subframes, said first plurality of OFDM resources depending at least in part on a first base station identifier of said first base station;
       ii) estimate a first signal strength corresponding to said first base station based on said received first reference signal;
       iii) receive a second reference signal from a second base station, on a second plurality of OFDM resources in said first subframe, said second plurality of OFDM resources depending at least in part on a second base station identifier of said second base station;
       iv) estimate a second signal strength corresponding to said second base station based on said received second reference signal;
       v) estimate an interference value on said second plurality of OFDM resources based at least in part on said second reference signal; and
       vi) calculate a signal to interference ratio value based on said second signal strength and a total interference value, wherein:
          (1) if said first plurality of OFDM resources overlap with said second plurality of OFDM resources, said total interference value is computed based upon said interference value; and
          (2) if said first plurality of OFDM resources do not overlap with said second plurality of OFDM resources, said total interference value is computed based upon said interference value plus said first signal strength.

18. The wireless device of claim 17, wherein said first signal strength is represented by one of the following:
    a) a short term signal strength value obtained from a most recent observation; and
    b) a long term signal strength value obtained by averaging a plurality of recent observations.

19. The wireless device of claim 17, wherein said second signal strength is represented one of the following:
    a) a short term signal strength value obtained from a most recent observation; and
    b) a long term signal strength value obtained by averaging a plurality of recent observations.

20. The wireless device of claim 17, wherein said interference value is one of the following:
   a) a short term interference value obtained from a most recent observation; and
   b) a long term interference value obtained by averaging a plurality of recent observations.

\* \* \* \* \*